[19] United States Patent
Park

(10) Patent No.: US 12,510,515 B2
(45) Date of Patent: Dec. 30, 2025

(54) APPARATUS AND METHOD FOR ANALYZING ROAD SURFACE CONDITION

(71) Applicant: SK Planet Co., Ltd., Seongnam-si (KR)

(72) Inventor: Yeonghyeon Park, Cheonan-si (KR)

(73) Assignee: SK Planet Co. Ltd., Seongnam-si (KR)

( * ) Notice: Subject to any disclaimer, the term of this patent is extended or adjusted under 35 U.S.C. 154(b) by 402 days.

(21) Appl. No.: 17/903,486

(22) Filed: Sep. 6, 2022

(65) Prior Publication Data

US 2023/0184722 A1 Jun. 15, 2023

(30) Foreign Application Priority Data

Dec. 10, 2021 (KR) .................. 10-2021-0177057
Dec. 20, 2021 (KR) .................. 10-2021-0183100

(51) Int. Cl.
*G01N 29/12* (2006.01)
*G01D 21/02* (2006.01)
*G01N 29/44* (2006.01)

(52) U.S. Cl.
CPC .............. *G01N 29/12* (2013.01); *G01D 21/02* (2013.01); *G01N 29/4481* (2013.01); *G01N 2291/0232* (2013.01)

(58) Field of Classification Search
CPC .............. G01N 29/12; G01N 29/4481; G01N 2291/0232; G01N 29/04; G01D 21/02; G06F 3/16; G06N 3/044; G06N 3/0464; G06N 3/08; G08G 1/0116
See application file for complete search history.

(56) References Cited

U.S. PATENT DOCUMENTS

| 9,170,102 | B2 * | 10/2015 | Hanatsuka | B60T 8/172 |
| 2014/0342337 | A1 * | 11/2014 | Bowden | G09B 7/02 434/314 |
| 2016/0349219 | A1 * | 12/2016 | Paturle | B60C 23/00 |
| 2017/0284824 | A1 * | 10/2017 | Korzunov | G01C 21/3697 |
| 2020/0298756 | A1 * | 9/2020 | Cattani | G01S 3/801 |
| 2021/0065733 | A1 * | 3/2021 | Sallem | G10L 15/08 |
| 2022/0126864 | A1 * | 4/2022 | Moustafa | B60W 60/0011 |

FOREIGN PATENT DOCUMENTS

DE 112019000020 * 2/2019 ............. G06N 3/048

* cited by examiner

*Primary Examiner* — Alexander Satanovsky
(74) *Attorney, Agent, or Firm* — WTA IP Law P.C.

(57) ABSTRACT

Analyzing the condition of a road surface by using a frequency-of-interest or a resonance sound in a tire. A training audio signal is sent to a learning unit, a label generator and a frequency selection model that does not complete learning. The training audio signal is obtained by collecting driving noise generated when a vehicle travels on a road. The label generator generates a label audio-of-interest signal by attenuating a band other than a frequency-of-interest band in the training audio signal. The frequency selection model derives a training imitated audio-of-interest signal imitating an audio-of-interest signal by performing a plurality of operations in which an unlearned weight is applied to the training audio signal. The learning unit calculates a generation loss that is a difference between the training imitated audio-of-interest signal and the label audio-of-interest signal, and performs optimization of updating the weight of the frequency selection model.

10 Claims, 13 Drawing Sheets

APPARATUS AND METHOD FOR ANALYZING ROAD SURFACE CONDITION

CROSS-REFERENCE TO RELATED APPLICATIONS

The present application is based upon and claims the benefit of priority to Korean Patent Application Nos. 10-2021-0177057, filed on Dec. 10, 2021, and 10-2021-0183100, filed on Dec. 20, 2021, which are incorporated by reference herein in their entirety.

TECHNICAL FIELD

The present disclosure relates to a technology for analyzing a road surface condition, and more particularly, to an apparatus and method for analyzing the condition of a road surface by selecting a frequency-of-interest from audio acquired from a target such as a friction sound between a tire and a road surface or a resonance sound in a tire.

BACKGROUND ART

In general, road surface conditions due to bad weather, such as hydroplaning, icy, and snow-covered conditions, are used as important information for efficient road management and traffic safety. For example, traffic accidents due to black ice (or clear ice) are frequent recently. Black ice refers to a phenomenon that a thin layer of ice is formed as if coated on the road surface, and this phenomenon is caused when snow and moisture get entangled with soot and dust in the air and then freeze to black through cracks in the road surface. Black ice usually occurs in the winter in shady and cool places such as on bridges, at tunnel entrances, on shady roads, or in the shade of mountain corners.

The existing road surface condition management utilizes equipment called a road weather information system. The road weather information system can provide road surface condition information and atmospheric condition prediction information in real time by using the data of the weather observation system. Therefore, the real-time information provided by the road weather information system is useful for safe driving of drivers or for making decisions about road management by road operators. However, the road weather information system has a limitation in its dissemination because equipment installation and maintenance costs are very high.

SUMMARY

Accordingly, the present disclosure is intended to provide an apparatus and method for a road surface condition by analyzing an audio-of-interest signal having only a frequency-of-interest in audio signals collected from a road.

In addition determining, the present disclosure is intended to provide an apparatus and method for analyzing a road surface condition by using audio acquired from a target such as a resonance sound inside a tire of a vehicle driving on a road or a friction sound between the tire and the road surface.

According to an embodiment of the present disclosure, a method for analyzing a road surface condition may include inputting, by a learning unit, a training audio signal, which is an audio signal obtained by collecting driving noise generated when a vehicle travels on a road, to a label generator and a frequency selection model that does not complete learning; generating, by the label generator, a label audio-of-interest signal by attenuating a band other than a frequency-of-interest band in the training audio signal; deriving, by the frequency selection model, a training imitated audio-of-interest signal imitating an audio-of-interest signal in which a band other than a frequency-of-interest band is attenuated from the training audio signal, by performing a plurality of operations in which an unlearned weight is applied to the training audio signal; calculating, by the learning unit, a generation loss that is a difference between the training imitated audio-of-interest signal and the label audio-of-interest signal; and performing, by the learning unit, optimization of updating the weight of the frequency selection model to minimize the generation loss.

In the method, generating the label audio-of-interest signal may include converting, by the label generator, the training audio signal into a frequency domain signal; and erasing, by the label generator, a frequency band other than the frequency-of-interest band by using one or more band filters in the training audio signal.

In the method, generating the label audio-of-interest signal may further include removing noise generated in a predetermined frequency band by using a noise removal filter.

The method may further include receiving, by a signal processing unit, an audio signal; detecting, by the signal processing unit, an audio-of-interest signal from the received audio signal through the learned frequency selection model; and recognizing, by a recognition unit, a road surface condition indicated by the audio signal by analyzing the audio-of-interest signal through a recognition model.

In the method, detecting the audio-of-interest signal may include detecting, by the frequency selection model, the audio-of-interest signal in which the band other than the frequency-of-interest band is attenuated from the received audio signal, by performing a plurality of operations in which a learned weight is applied to the received audio signal.

In the method, recognizing the road surface condition may include inputting, by the recognition unit, the audio-of-interest signal to the recognition model; calculating, by the recognition model, a predictive value for predicting the road surface condition by performing a plurality of operations in which learned weights between layers are applied to the inputted audio-of-interest signal; and recognizing, by the recognition unit, the road surface condition indicated by the inputted audio-of-interest signal based on the predictive value.

The method may further include, before receiving the audio signal, preparing, by the learning unit, learning data including a training audio-of-interest signal and a label corresponding to the training audio-of-interest signal; inputting, by the learning unit, the training audio-of-interest signal into a recognition model that does not complete learning; calculating, by the recognition model, a predictive value which is a probability predicted for each of a plurality of road surface conditions through a plurality of operations in which unlearned weights between layers are applied to the training audio-of-interest signal; calculating, by the learning unit, a classification loss indicating a difference between the predictive value and the label; and performing optimization for correcting the weight of the recognition model to minimize the classification loss.

According to an embodiment of the present disclosure, an apparatus for analyzing a road surface condition may include a label generator configured to generate a label audio-of-interest signal by attenuating a band other than a frequency-of-interest band in a training audio signal which is an audio signal obtained by collecting driving noise generated when a vehicle travels on a road; and a learning unit configured to input the training audio signal to the label generator and a frequency selection model that does not complete learning, to, when the label generator generates the label audio-of-interest signal, and when the frequency selection model derives a training imitated audio-of-interest signal imitating an audio-of-interest signal in which a band other than a frequency-of-interest band is attenuated from the training audio signal, by performing a plurality of operations in which an unlearned weight is applied to the training audio signal, calculate a generation loss that is a difference between the training imitated audio-of-interest signal and the label audio-of-interest signal, and to perform optimization of updating the weight of the frequency selection model to minimize the generation loss.

In the apparatus, the label generator may be configured to convert the training audio signal into a frequency domain signal, and to erase a frequency band other than the frequency-of-interest band by using one or more band filters in the training audio signal.

In the apparatus, the label generator may be configured to remove noise generated in a predetermined frequency band by using a noise removal filter.

The apparatus may further include a signal processing unit configured to, upon receiving an audio signal, detect an audio-of-interest signal from the received audio signal through the learned frequency selection model; and a recognition unit configured to recognize a road surface condition indicated by the audio signal by analyzing the audio-of-interest signal through a recognition model.

In the apparatus, the frequency selection model may detect the audio-of-interest signal in which the band other than the frequency-of-interest band is attenuated from the received audio signal, by performing a plurality of operations in which a learned weight is applied to the received audio signal.

In the apparatus, the recognition unit may be configured to input the audio-of-interest signal to the recognition model, and to, when the recognition model calculates a predictive value for predicting the road surface condition by performing a plurality of operations in which learned weights between layers are applied to the inputted audio-of-interest signal, recognize the road surface condition indicated by the inputted audio-of-interest signal based on the predictive value.

In the apparatus, the learning unit may be configured to prepare learning data including a training audio-of-interest signal and a label corresponding to the training audio-of-interest signal, to input the training audio-of-interest signal into a recognition model that does not complete learning, to, when the recognition model calculates a predictive value which is a probability predicted for each of a plurality of road surface conditions through a plurality of operations in which unlearned weights between layers are applied to the training audio-of-interest signal, calculate a classification loss indicating a difference between the predictive value and the label, and to perform optimization for correcting the weight of the recognition model to minimize the classification loss.

According to an embodiment of the present disclosure, a method for analyzing a road surface condition may include receiving, by a signal processing unit, an audio signal collected inside a tire when friction between the tire of a vehicle and a road surface occurs while the vehicle is driving; detecting, by the signal processing unit, an audio-of-interest signal, which is an audio signal of a frequency-of-interest band corresponding to a resonance sound generated inside the tire, from the received audio signal; inputting, by a recognition unit, the audio-of-interest signal to a learned road-surface recognition model; calculating, by the road-surface recognition model, a predictive value that is a probability predicted for each of a plurality of road surface conditions through an operation in which a learned weight between layers is applied to the inputted audio-of-interest signal; and recognizing, by the recognition unit, a road surface condition based on the calculated predictive value.

In the method, the frequency-of-interest band may be a dominant frequency band of the resonance sound inside the tire generated by friction between the tire and the road surface when the vehicle is driving.

The method may further include, before receiving the audio signal, preparing, by a learning unit, training data including a training audio-of-interest signal and a label, the training audio-of-interest signal being generated by detecting an audio signal in a frequency-of-interest band from an audio signal inside the tire generated by friction between the tire and the road surface while the vehicle is driving, and the label indicating one of a plurality of conditions corresponding to the training audio-of-interest signal; inputting, by the learning unit, the training audio-of-interest signal to a road-surface recognition model that does not complete learning; calculating, by the road-surface recognition model, a predictive value that is a probability predicted for each of a plurality of road surface conditions through a plurality of operations in which unlearned weights between layers are applied to the training audio-of-interest signal; calculating, by the learning unit, a classification loss indicating a difference between the predictive value and the label; and performing, by the learning unit, optimization of correcting the weight of the road-surface recognition model to minimize the classification loss.

The method may further include inputting, by the recognition unit, the audio-of-interest signal to a learned deterioration recognition model; deriving, by the deterioration recognition model, an imitated audio-of-interest signal imitating the inputted audio-of-interest signal by performing a plurality of operations in which a learned weight between layers is applied to the inputted audio-of-interest signal; calculating, by the recognition unit, a reconstruction error indicating a difference between the imitated audio-of-interest signal and the inputted audio-of-interest signal; and determining, by the recognition unit, that the tire is in a deteriorated condition when the calculated restoration error is equal to or greater than a predetermined threshold.

The method may further include, before receiving the audio signal, preparing, by the learning unit, a training audio-of-interest signal by detecting an audio signal in a frequency-of-interest band from an audio signal inside the tire generated by friction between the tire and the road surface when the vehicle is driving with the tire in a normal state; inputting, by the learning unit, the training audio-of-interest signal to a deterioration recognition model that does not complete learning; generating, by the deterioration recognition model, a training imitated audio-of-interest signal imitating the training audio-of-interest signal by performing a plurality of operations in which an unlearned weight between layers is applied to the training audio-of-interest signal; calculating, by the learning unit, a restoration loss that is a difference between the training audio-of-interest signal and the training imitated audio-of-interest signal; and performing, by the learning unit, optimization of updating the weight of the deterioration recognition model to minimize the restoration loss.

The method may further include, before receiving the audio signal and after performing the optimization, calculating, by the learning unit, a threshold value θ according to Equation $\theta=\mu+(k\times\sigma)$, wherein μ denotes an average of a mean squared error (MSE) between a plurality of test audio-of-interest signals and a plurality of test imitated audio-of-interest signals corresponding to the plurality of test audio-of-interest signals, σ denotes a standard deviation of the MSE between the plurality of test audio-of-interest signals and the plurality of test imitated audio-of-interest signals, and k denotes a weight for the standard deviation.

According to an embodiment of the present disclosure, an apparatus for analyzing a road surface condition may include a signal processing unit configured to, upon receiving an audio signal collected inside a tire when friction between the tire of a vehicle and a road surface occurs while the vehicle is driving, detect an audio-of-interest signal, which is an audio signal of a frequency-of-interest band corresponding to a resonance sound generated inside the tire, from the received audio signal; and a recognition unit configured to input the audio-of-interest signal to a learned road-surface recognition model, and to, when the road-surface recognition model calculates a predictive value that is a probability predicted for each of a plurality of road surface conditions through an operation in which a learned weight between layers is applied to the inputted audio-of-interest signal, recognize a road surface condition based on the calculated predictive value.

In the apparatus, the frequency-of-interest band may be a dominant frequency band of the resonance sound inside the tire generated by friction between the tire and the road surface when the vehicle is driving.

The apparatus may further include a learning unit configured to prepare training data including a training audio-of-interest signal and a label, the training audio-of-interest signal being generated by detecting an audio signal in a frequency-of-interest band from an audio signal inside the tire generated by friction between the tire and the road surface while the vehicle is driving, and the label indicating one of a plurality of conditions corresponding to the training audio-of-interest signal, to input the training audio-of-interest signal to a road-surface recognition model that does not complete learning, to, when the road-surface recognition model calculates a predictive value that is a probability predicted for each of a plurality of road surface conditions through a plurality of operations in which unlearned weights between layers are applied to the training audio-of-interest signal, calculate a classification loss indicating a difference between the predictive value and the label, and to perform optimization of correcting the weight of the road-surface recognition model to minimize the classification loss.

In the apparatus, the recognition unit may be further configured to input the audio-of-interest signal to a learned deterioration recognition model, to, when the deterioration recognition model derives an imitated audio-of-interest signal imitating the inputted audio-of-interest signal by performing a plurality of operations in which a learned weight between layers is applied to the inputted audio-of-interest signal, calculate a reconstruction error indicating a difference between the imitated audio-of-interest signal and the inputted audio-of-interest signal, and to determine that the tire is in a deteriorated condition when the calculated restoration error is equal to or greater than a predetermined threshold.

The apparatus may further include a learning unit configured to prepare a training audio-of-interest signal by detecting an audio signal in a frequency-of-interest band from an audio signal inside the tire generated by friction between the tire and the road surface when the vehicle is driving with the tire in a normal state, to input the training audio-of-interest signal to a deterioration recognition model that does not complete learning, to, when the deterioration recognition model generates a training imitated audio-of-interest signal imitating the training audio-of-interest signal by performing a plurality of operations in which an unlearned weight between layers is applied to the training audio-of-interest signal, calculate a restoration loss that is a difference between the training audio-of-interest signal and the training imitated audio-of-interest signal, and to perform optimization of updating the weight of the deterioration recognition model to minimize the restoration loss.

In the apparatus, the learning unit may be further configured to calculate a threshold value θ according to Equation $\theta=\Xi+(k\times\sigma)$, wherein μ denotes an average of a mean squared error (MSE) between a plurality of test audio-of-interest signals and a plurality of test imitated audio-of-interest signals corresponding to the plurality of test audio-of-interest signals, σ denotes a standard deviation of the MSE between the plurality of test audio-of-interest signals and the plurality of test imitated audio-of-interest signals, and k denotes a weight for the standard deviation.

According to the present disclosure, using a frequency selection model trained to detect an audio signal in a dominant frequency band of driving noise generated when a vehicle travels on a road, it is possible to detect an audio-of-interest signal from audio signals. Analyzing the audio-of-interest signal makes it possible to more accurately determine a road surface condition.

In addition, according to the present disclosure, using a learning model (deep learning model or machine learning model) that has learned resonance sounds obtained through a microphone installed in a vehicle's tire, it is possible to recognize the deterioration of the tire as well as the road surface condition. The learning model is vulnerable to factors such as changes in the external environment, but there is little room for environmental changes inside the tire. Therefore, analyzing the resonance sounds in the tire can improve the reliability of recognizing the road surface condition and the deterioration of the tire.

In addition, according to the present disclosure, it is possible to perform the road surface condition analysis without limitation on an audio acquisition target such as a friction sound between a tire and a road surface or a resonance sound inside a tire.

DETAILED DESCRIPTION

Figure 1:
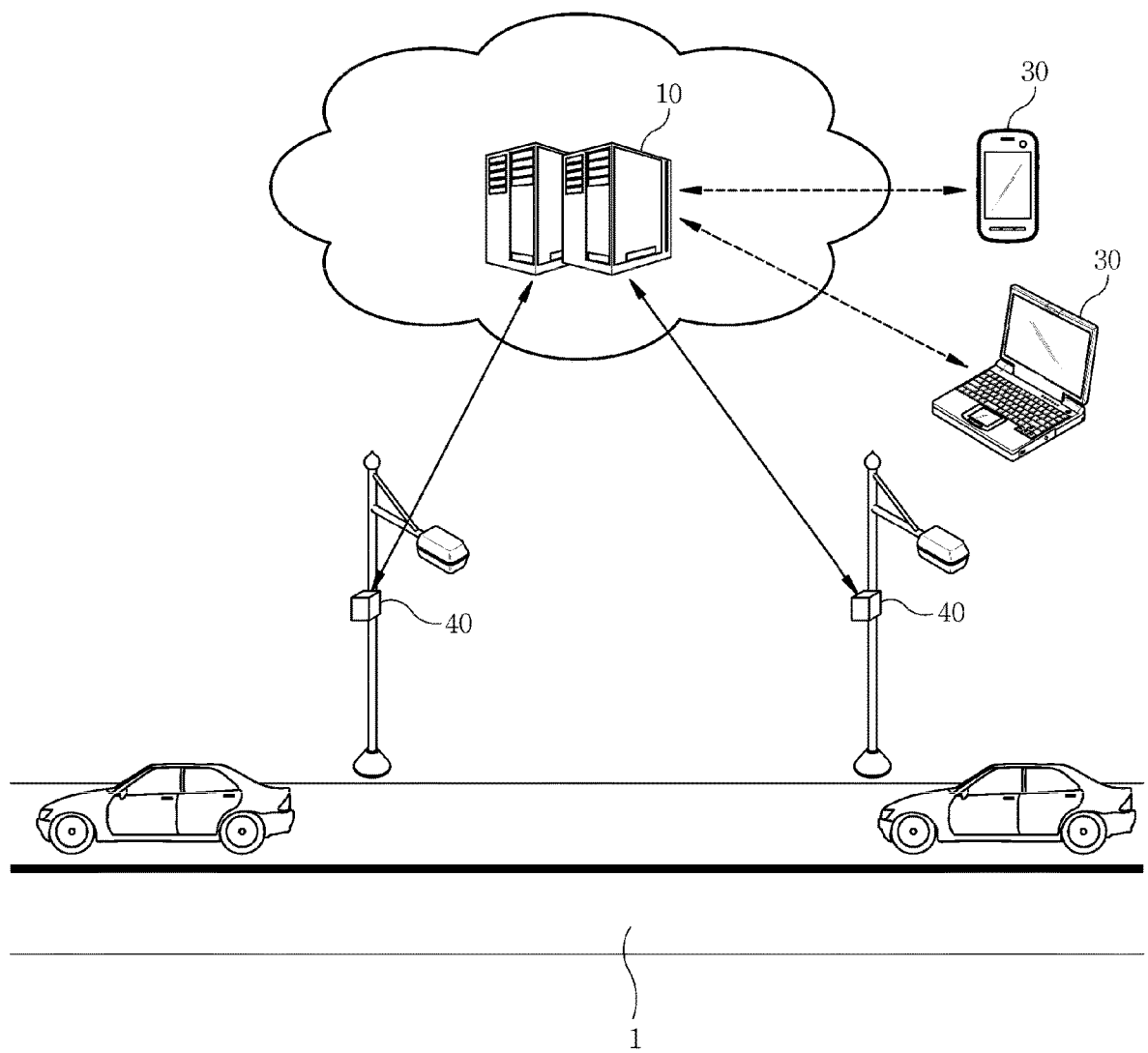
FIG. 1 is a diagram illustrating a system for analyzing a road surface condition by using the selection of a frequency-of-interest according to a first embodiment of the present disclosure.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Also, in the following description, especially in claims, singular forms are intended to include plural forms unless the context clearly indicates otherwise. That is, the terms "a", "an", "one", and "the" may be used as both singular and plural meanings unless the context clearly indicates otherwise.

The term "module" or "unit" used herein may refer to a hardware or software component or device, such as a field programmable gate array (FPGA) or application specific integrated circuit (ASIC), which performs at least one particular function, operation, or task. A module or unit may be configured to reside on an addressable storage medium and configured to execute on one or more processors.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

At the outset, a system for analyzing a road surface condition by using a frequency-of-interest selection according to a first embodiment of the present disclosure will be described. FIG. 1 is a diagram illustrating a system for analyzing a road surface condition by using the selection of a frequency-of-interest according to a first embodiment of the present disclosure. Referring to FIG. 1, the system according to the first embodiment includes a traffic server 10, a plurality of sensor devices 40 managed by the traffic server 10, and a manager device 30.

The traffic server 10 is an apparatus configured to analyze audio signals from the plurality of sensor devices 40 and thereby identify a road surface condition of a road 1. Specifically, the traffic server 10 receives audio signals from the plurality of sensor devices 40, processes and analyzes the received audio signals, and thereby identifies the road surface condition of the road 1.

The sensor devices 40 may be installed on the side of the road 1 and disposed to be spaced apart from each other by a predetermined distance. The sensor devices 40 may be arranged in a zigzag manner at both sides of the road 1 or may be arranged in a line at one side of the road 1. The sensor device 40 may include a microphone for collecting audio signals generated on the road, a transceiver for transmitting the audio signals to the traffic server 10, and a microcontroller unit (MCU) for controlling the microphone and the transceiver. The sensor device 40 may be an Internet of Things (IoT) device. The sensor device 40 may access the traffic server 10 through a network and transmit audio signals collected at its installed location to the traffic server 10. In case that there are a plurality of sensor devices 40, the plurality of sensor devices 40 may organize a sensor network. In this case, each of the plurality of sensor devices 40 may transmit a measured audio signal to any one sensor device 40, which may transmit a plurality of received audio signals to the traffic server 10.

The manager device 30 is an apparatus used by a manager responsible for managing the traffic server 10 and the sensor devices 40. The manager device 30 may be, for example, a smartphone, a tablet, a phablet, a notebook computer, or a personal computer. The manager device 30 may access the traffic server 10 in response to a manager's manipulation and perform necessary settings or receive information provided by the traffic server 10.

Figure 2:
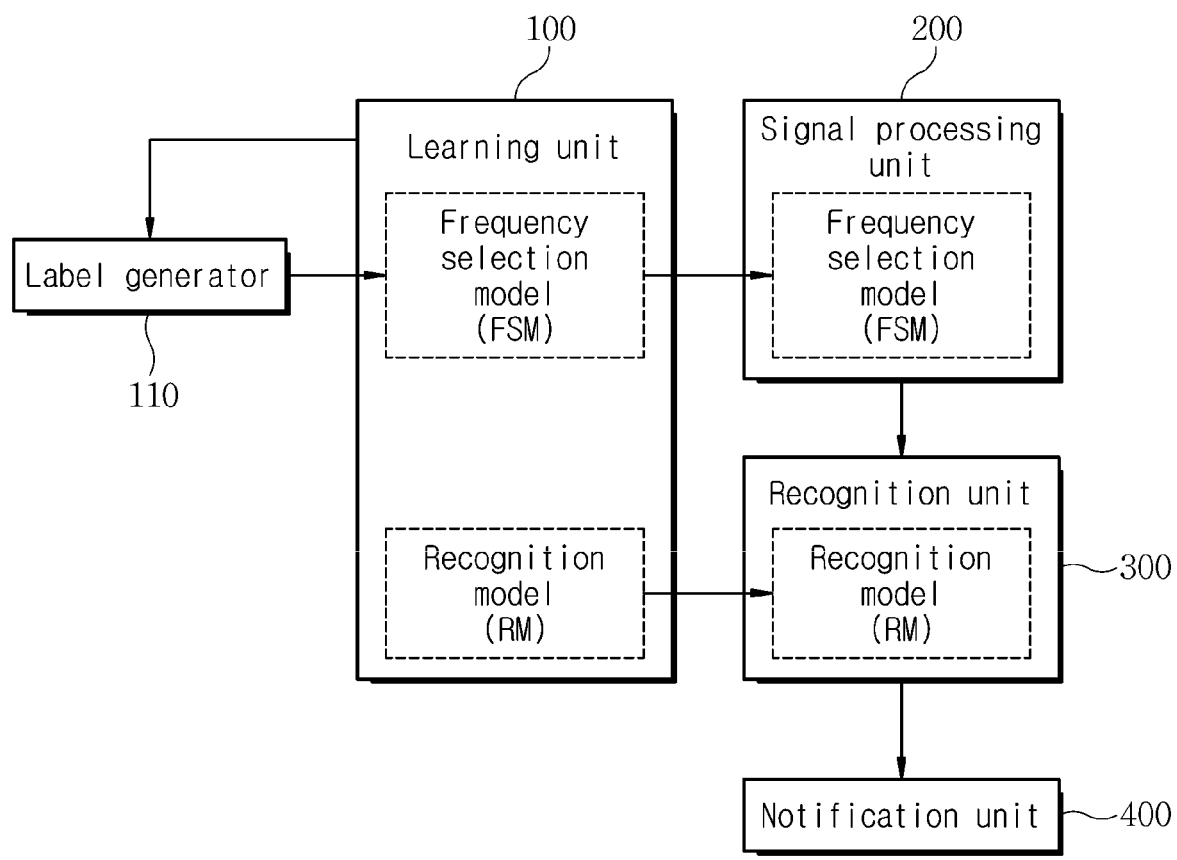
FIG. 2 is a block diagram illustrating the configuration of a traffic server according to the first embodiment of the present disclosure.
Figure 3:
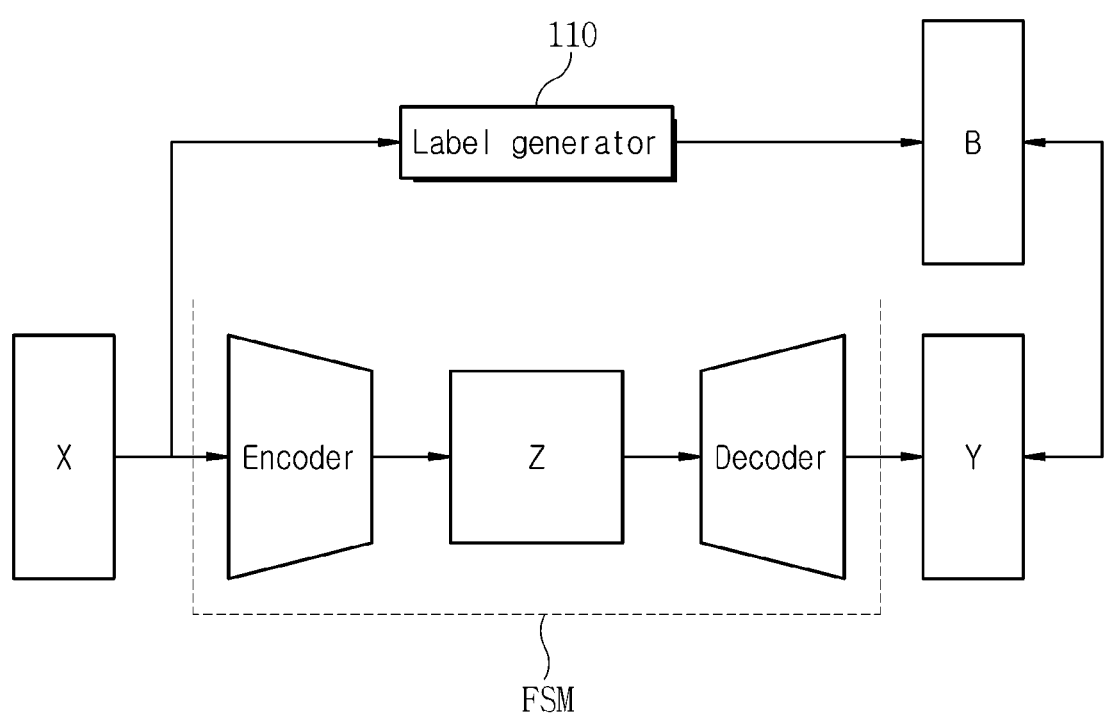
FIG. 3 is a diagram illustrating a method for generating a label by the label generator according to the first embodiment of the present disclosure.

Next, the traffic server 10 according to the first embodiment of the present disclosure will be described in more detail. FIG. 2 is a block diagram illustrating the configuration of a traffic server according to the first embodiment of the present disclosure. FIG. 3 is a diagram illustrating a method for generating a label by the label generator according to the first embodiment of the present disclosure.

Referring to FIG. 2, the traffic server 10 includes a learning unit 100, a signal processing unit 200, a recognition unit 300, and a notification unit 400. In addition, the traffic server 10 further includes a label generator 110.

The learning unit 100 is a component configured to generate a frequency selection model (FSM) and a recognition model (RM). The learning unit 100 can provide the generated frequency selection model FSM to the signal processing unit 200 and also provide the generated recognition model RM to the recognition unit 300.

The label generator 110 is a component configured to generate a label when the learning unit 100 generates the frequency selection model FSM. When learning, the learning unit 100 enters a training audio signal X to the frequency selection model FSM and simultaneously enters the same training audio signal X to the label generator 110 as shown in FIG. 3. Then, the label generator 110 generates a label audio-of-interest signal B by attenuating a band other than a frequency-of-interest band in the training audio signal X through one or more band filters. The generated label audio-of-interest signal B may be used as a label.

Each of the frequency selection model FSM and the recognition model RM includes a plurality of layers, and each of the plurality of layers performs a plurality of operations. In one layer, each of operation results of a plurality of operation modules is weighted and then transmitted to the next layer. This means that a weight is applied to an operation result of one layer and the weighted result is inputted to the operation of the next layer. That is, each of the frequency selection model FSM and the recognition model RM performs a plurality of operations in which weights of a plurality of layers are applied.

The frequency selection model FSM may be a generative network that generates an audio-of-interest signal in which a band other than a frequency-of-interest band is attenuated from an input audio signal. The frequency selection model FSM may be, for example, a Restricted Boltzmann Machine (RBM), an Auto-Encoder (AE), a Generative Adversarial Network (GAN), and the like.

Referring to FIG. 3, in case that the frequency selection model FSM is an auto-encoder (AE), the frequency selection model FSM includes an encoder (EN) and a decoder (DE). The frequency selection model FSM including the encoder and the decoder includes a plurality of layers, and the plurality of layers includes a plurality of operations. In addition, the plurality of layers are connected by a weight (W). The operation result of one layer is weighted and then becomes an input of the next layer. That is, one layer of the frequency selection model FSM receives a weighted value from the previous layer, performs an operation on it, and transmits the operation result to the input of the next layer.

The encoder includes convolution layers (CLs) including a convolution operation and an operation by an activation function. In addition, a pooling layer (PL) that performs a maximum pooling operation may be applied between the convolutional layers of the encoder. When the audio signal X is inputted, the encoder performs a plurality of operations in which weights between layers are applied to the input audio signal X, thereby compressing (encoding) the audio signal and deriving a latent vector Z.

The decoder includes deconvolution layers (DLs) including a deconvolution operation and an operation by an activation function. The decoder receives the latent vector Z and performs a plurality of operations in which weights between layers are applied to the input latent vector Z. Thus, an imitated audio-of-interest signal Y is generated by imitating the audio-of-interest signal in which a band other than a frequency-of-interest band is attenuated in the audio signal.

The recognition model RM may be a classification network that when an audio-of-interest signal is inputted, performs a plurality of operations in which a plurality of layer weights are applied, and thereby computes a predictive value for a road surface condition (normal, hydroplaning, icy, snow-covered, etc.). The predictive value is a predicted probability for each of a plurality of predetermined road surface conditions. For example, assuming that the predetermined road surface conditions are four including normal, hydroplaning, icy, and snow-covered, the predictive value represents probabilities of four conditions. For example, the predictive value may be expressed as '(normal, hydroplaning, icy, snow-covered)=[0.01, 0.02, 0.17, 0.80]'. This means that the probability that the road surface is in a normal condition is 1%, the probability that the road surface is in a hydroplaning condition is 2%, the probability that the road surface is in an icy condition is 17%, and the probability that the road surface is in a snow-covered condition is 80%. The recognition model RM may be, for example, a Convolution Neural Network (CNN), a Recurrent Neural Network (RNN), or the like.

The plurality of layers in each of the frequency selection model FSM and the recognition model RM includes one or a combination of a fully-connected layer, a convolutional layer, a recurrent layer, a graph layer, and a pooling layer. The plurality of operations may include, for example, a convolution operation, a down-sampling operation, an up-sampling operation, an operation by an activation function, and the like. The activation function may be, for example, Sigmoid, Hyperbolic tangent (tanh), Exponential Linear Unit (ELU), Rectified Linear Unit (ReLU), Leakly ReLU, Maxout, Minout, Softmax, and the like.

The signal processing unit 200 is a component configured to receive audio signals from the sensor devices 40 and detect an audio-of-interest signal from the received audio signals. In particular, using the frequency selection model FSM, the signal processing unit 200 can detect an audio-of-interest signal from the audio signals. The signal processing unit 200 provides the detected audio-of-interest signal to the recognition unit 300. The audio-of-interest signal refers to an audio signal of a frequency-of-interest band among audio signals. The frequency-of-interest band refers to a frequency band in which driving noise is generated. The frequency-of-interest band may be predetermined. Specifically, a dominant frequency band of the driving noise generated as the vehicle is driven may be set as the frequency-of-interest band. The dominant frequency band refers to a frequency band that is repeatedly detected a predetermined number of times or more among frequency bands detected from different driving noises. For example, a frequency band that is repeatedly detected a specific number of times or more among frequency bands detected from a plurality of driving noises collected a plurality of number of times may be the dominant frequency band.

The recognition unit 300 is a component configured to analyze the audio-of-interest signal through the recognition model RM and recognize the road surface condition indicated by the audio-of-interest signal.

The notification unit 400 is a component configured to provide the road surface condition recognized by the recognition unit 300 to the manager device 30. Also, the notification unit 400 may provide the road surface condition to a trip computer of the vehicle.

Figure 4:
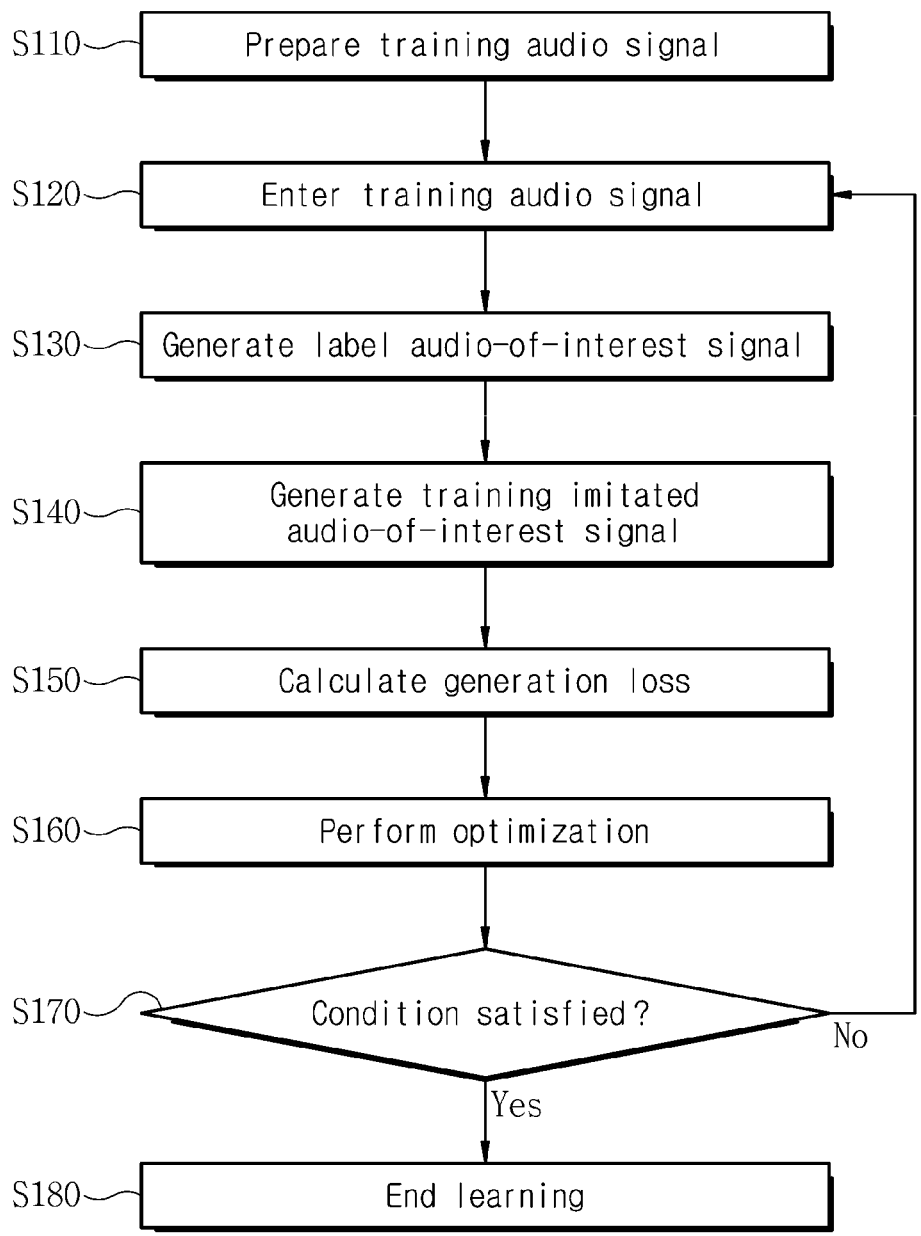
FIG. 4 is a flowchart illustrating a method for generating a frequency selection model according to the first embodiment of the present disclosure.

Next, a method for generating a frequency selection model FSM according to the first embodiment of the present disclosure will be described. FIG. 4 is a flowchart illustrating a method for generating a frequency selection model according to the first embodiment of the present disclosure.

Referring to FIG. 4, the learning unit 100 (in FIG. 2) prepares a training audio signal at step S110. The training audio signal is an audio signal obtained by collecting driving noises generated when the vehicle travels on a road.

At step S120, the learning unit 100 enters the training audio signal into the label generator 110 (in FIGS. 2 and 3) and the frequency selection model FSM that does not complete learning.

When the training audio signal is inputted, the label generator 110 generates, at step S130, a label audio-of-interest signal by attenuating a band other than a frequency-of-interest band in the training audio signal through one or more band filters. The label audio-of-interest signal is the same as the audio-of-interest signal (ground truth), meaning that it is used only as a label. As described above, the frequency-of-interest band refers to a frequency band in which driving noise is generated. The frequency-of-interest band may be predetermined. For example, a dominant frequency band of the driving noise generated as the vehicle is driven may be set as the frequency-of-interest band. The dominant frequency band refers to a frequency band that is repeatedly detected a predetermined number of times or more among frequency bands detected from different driving noises. For example, a frequency band that is repeatedly detected a specific number of times or more among frequency bands detected from a plurality of driving noises collected a plurality of number of times may be the dominant frequency band.

In addition, when the training audio signal is inputted, the frequency selection model FSM generates, at step S140, a training imitated audio-of-interest signal by through a plurality of operations in which unlearned weights between layers are applied to the training audio signal. For example, in case that the frequency selection model FSM is an auto-encoder, the encoder of the frequency selection model FSM performs a plurality of operations in which a plurality of layer weights are applied to the training audio-of-interest signal, thereby compressing the training audio-of-interest signal and generating a latent vector, and the decoder of the frequency selection model FSM performs a plurality of operations in which a plurality of layer weights are applied to the latent vector generated by the encoder, thereby generating the training imitated audio-of-interest signal.

Then, at step S150, the learning unit 100 calculates a generation loss indicating a difference between the training imitated audio-of-interest signal and the label audio-of-interest signal through a loss function.

Then, at step S160, the learning unit 100 performs optimization for updating the weight of the frequency selection model FSM through a backpropagation algorithm to minimize the generation loss.

Then, at step S170, the learning unit 100 determines whether a condition necessary for the end of learning is satisfied. This condition may be whether the generation loss calculated at the step S150 is less than a predetermined target value. If it is determined at the step S170 that the condition necessary for the end of learning is not satisfied, that is, if the generation loss calculated at the step S150 is equal to or greater than the target value, the process proceeds to step S120 and repeats steps S120 to S170. This means that learning is repeated using a plurality of different training audio signals. On the other hand, if it is determined at the step S170 that the condition necessary for the end of learning is satisfied, that is, if the generation loss calculated at the step S150 is less than the target value, the process proceeds to step S180 to end the learning. As such, when an audio signal is inputted, the frequency selection model FSM can generate an audio-of-interest signal from the audio signal.

Figure 5:
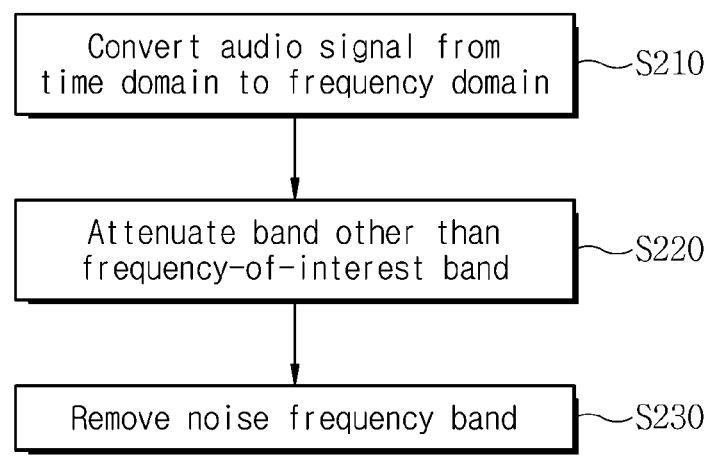
FIG. 5 is a flowchart illustrating a method for generating a label audio-of-interest signal from an audio signal according to the first embodiment of the present disclosure.

Next, the above-described step S130 will be described in more detail. FIG. 5 is a flowchart illustrating a method for generating a label audio-of-interest signal from an audio signal according to the first embodiment of the present disclosure. That is, the first embodiment shown in FIG. 5 corresponds to a detailed description of the step S130 shown in FIG. 4.

Referring to FIG. 5, when an audio signal is inputted, the label generator 110 converts the audio signal from the time domain to the frequency domain at step S210. To this end, Fourier Transform, Fast Fourier Transform, Discrete Fourier Transform, etc. may be used.

Then, at step S220, the label generator 110 erases the audio signal of a frequency band other than the frequency-of-interest band by using one or more band filters from the audio signal in the frequency domain. As the band filter, a high-pass filter, a low-pass filter, a band-pass filter, a notch filter, or the like may be used.

Additionally, at step S230, the label generator 110 may remove noise generated in a predetermined frequency band by using a noise removal filter. It is preferable to use a notch filter as the noise removal filter. However, any other filter such as a high-pass filter, a low-pass filter, or a band-pass filter may be used alternatively.

Figure 6:
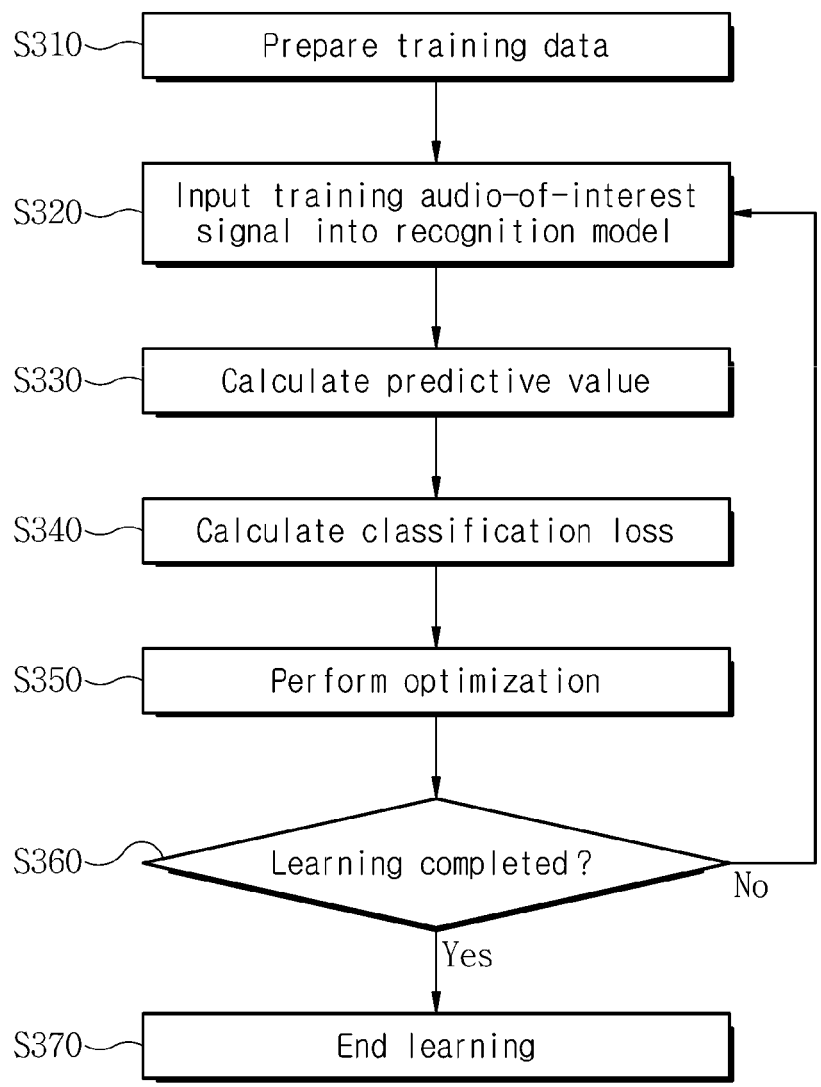
FIG. 6 is a flowchart illustrating a method for generating a recognition model according to the first embodiment of the present disclosure.

Next, a method for generating the recognition model RM according to the first embodiment of the present disclosure will be described. FIG. 6 is a flowchart illustrating a method for generating a recognition model according to the first embodiment of the present disclosure.

Referring to FIG. 6, at step S310, the learning unit 100 (in FIG. 2) prepares training data for the recognition model RM. The training data includes a training audio-of-interest signal and a label. As the training audio-of-interest signal, the label audio-of-interest signal generated by the label generator 110 (in FIGS. 2 and 3) at the above step S130 may be used. The label may be a vector value indicating a road surface condition corresponding to the training audio-of-interest signal. For example, the label may be a one-hot-encoding vector that indicates any one of normal, hydroplaning, icy, and snow-covered conditions.

At step S320, the learning unit 100 inputs the training audio-of-interest signal into the recognition model RM. Then, at step S330, the recognition model RM calculates a predictive value for predicting the road surface condition through a plurality of operations in which unlearned weights between layers are applied. The predictive value indicates a predicted probability for each of a plurality of road surface conditions.

Then, at step S340, the learning unit 100 calculates a classification loss indicating a difference between the predictive value and the label through a loss function. For example, the learning unit 100 may obtain the classification loss through a binary cross-entropy function that is the loss function.

Then, at step S350, the learning unit 100 performs optimization for correcting the weight of the recognition model RM to minimize the classification loss derived through the loss function. For example, to minimize the binary cross-entropy loss, the learning unit 100 performs optimization for correcting the weight of the recognition model RM.

The above steps S320 to S350 are repeatedly performed using a plurality of different training data, and thus the weight of the recognition model RM is repeatedly updated.

Such iteration is performed until the classification loss becomes less than or equal to a predetermined target value. Therefore, at step S360, the learning unit 100 determines whether the classification loss calculated at the step S340 is less than or equal to the predetermined target value. If the classification loss is less than or equal to the predetermined target value, the learning of the recognition model RM is completed at step S370.

Figure 7:
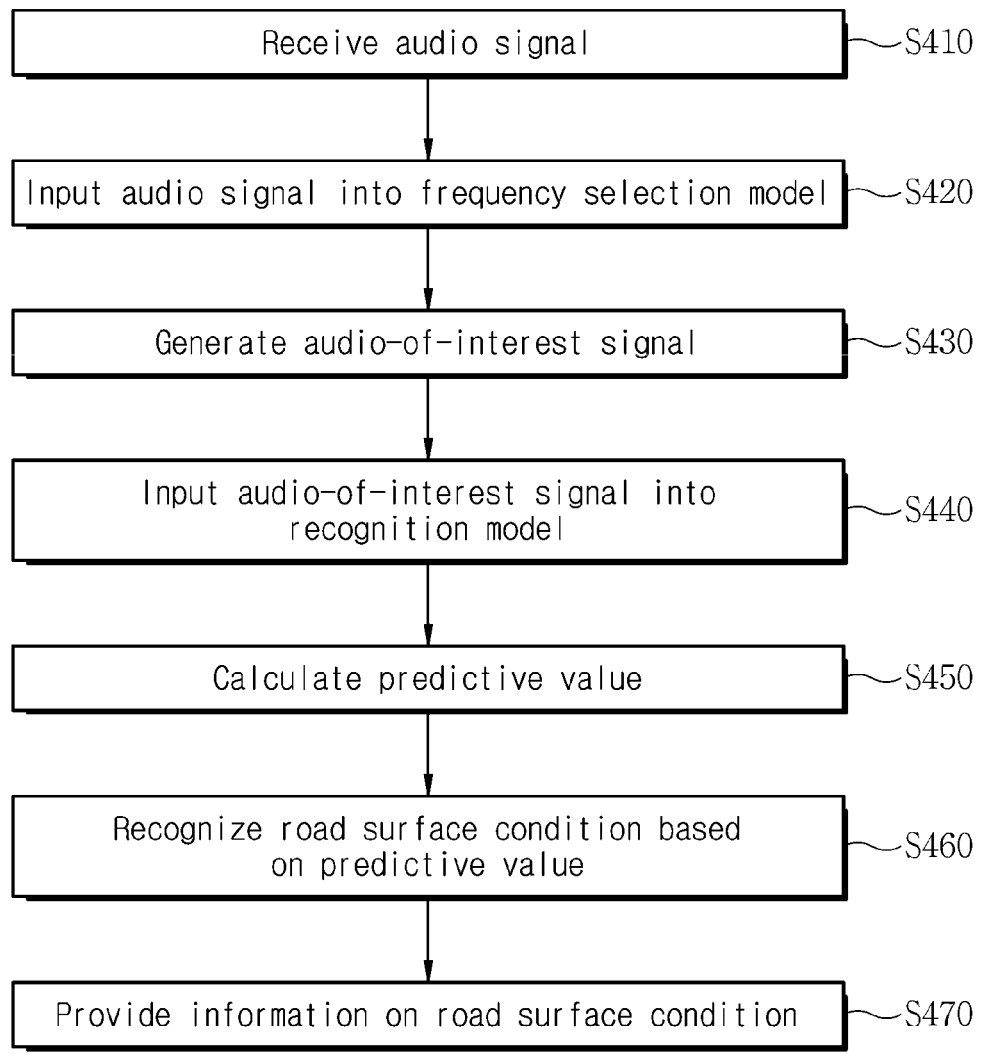
FIG. 7 is a flowchart illustrating a method for analyzing a road surface condition by using a frequency-of-interest selection according to the first embodiment of the present disclosure.

Next, a method for analyzing a road surface condition by using a frequency-of-interest selection according to the first embodiment of the present disclosure will be described. FIG. 7 is a flowchart illustrating a method for analyzing a road surface condition by using a frequency-of-interest selection according to the first embodiment of the present disclosure.

Referring to FIG. 7, at step S410, the signal processing unit 200 (in FIG. 2) receives an audio signal from the sensor device 40 (in FIG. 1) installed around the road 1 (in FIG. 1). Then, at step S420, the signal processing unit 200 inputs the received audio signal to the frequency selection model FSM (in FIGS. 2 and 3).

Then, at step S430, the frequency selection model FSM generates an audio-of-interest signal, which is an audio signal in which a band other than a frequency-of-interest band is attenuated from the received audio signal, by performing a plurality of operations in which a learned weight is applied to an audio signal. The frequency-of-interest band refers to a dominant frequency band of driving noise.

The signal processing unit 200 provides the generated audio-of-interest signal to the recognition unit 300 (in FIG. 2), and the recognition unit 300 inputs the audio-of-interest signal to the learned recognition model RM (in FIG. 2) at step S440.

Then, at step S450, the recognition model RM calculates a predictive value for predicting the road surface condition of the road around the sensor device 40 by performing a plurality of operations in which the learned weights between layers are applied.

Then, at step S460, the recognition unit 300 recognizes the road surface condition based on the predictive value. The predictive value is a predicted probability for each of a plurality of predetermined road surface conditions. Thus, from the highest probability in the predictive value, the recognition unit 300 can recognize the road surface condition.

For example, if the predictive value is expressed as '(normal, hydroplaning, icy, snow-covered)=[0.01, 0.02, 0.17, 0.80]', this means that the probability that the road surface is in a normal condition is 1%, the probability that the road surface is in a hydroplaning condition is 2%, the probability that the road surface is in an icy condition is 17%, and the probability that the road surface is in a snow-covered condition is 80%. Therefore, based on the highest probability, the recognition unit 300 can recognize that the road surface is in a snow-covered condition.

As such, the recognition unit 300 can recognize the road surface condition (normal, hydroplaning, icy, or snow-covered) according to the probability of each condition in the predictive value. Then, at step S470, the notification unit 400 (in FIG. 2) may provide the manager device 30 (in FIG. 1) with the road surface condition recognized by the recognition unit 300. For example, at the step S470, the notification unit may provide the road surface condition to a trip computer of a vehicle.

Figure 8:
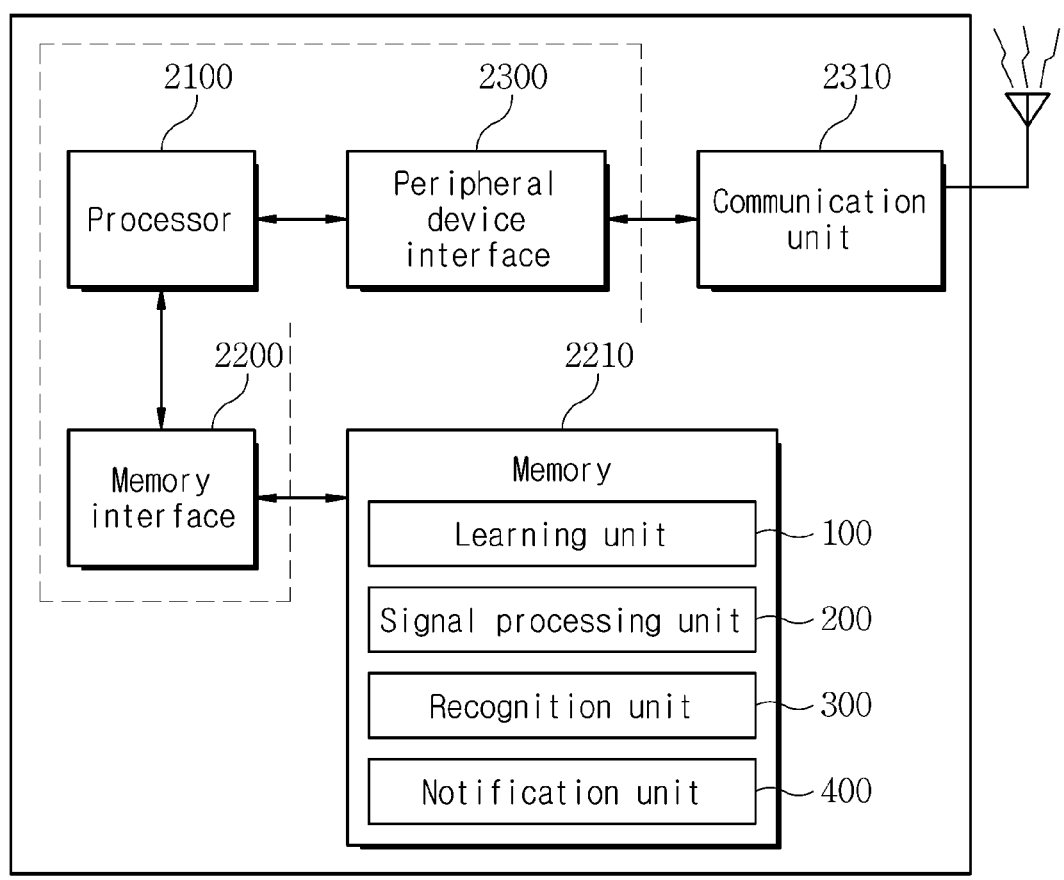
FIG. 8 is an exemplary diagram illustrating a hardware system for implementing an apparatus for analyzing a road surface condition by using a frequency-of-interest selection according to the first embodiment of the present disclosure.

FIG. 8 is an exemplary diagram illustrating a hardware system for implementing an apparatus for analyzing a road surface condition by using a frequency-of-interest selection according to the first embodiment of the present disclosure.

As shown in FIG. 8, the hardware system 2000 according to the first embodiment may have components including a processor 2100, a memory interface 2200, and a peripheral device interface 2300.

Each component in the hardware system 2000 may be an individual electronic component or be integrated in one or more integrated circuits, and these components may be electrically connected to each other via a bus system (not shown).

The bus system may include one or more individual physical buses, connected by suitable bridges, adapters, and/or controllers, communication lines/interfaces, and/or an abstraction representing multi-drop or point-to-point connections.

The processor 2100 communicates with the memory 2210 through the memory interface 2200 to perform various functions in the hardware system, thereby executing various software modules stored in the memory 2210.

In the memory 2210, the learning unit 100, the signal processing unit 200, the recognition unit 300, and the notification unit 400, which are components described above with reference to FIG. 2, may be stored in the form of a software module. Also, an operating system (OS) or the like may be further stored. Each of the learning unit 100, the signal processing unit 200, the recognition unit 300, and the notification unit 400 may be loaded and executed in the processor 2100.

Each of the learning unit 100, the signal processing unit 200, the recognition unit 300, and the notification unit 400 may be implemented in the form of a software module, a hardware module, or a combination thereof executed by a processor.

Such a software module, hardware module, or its combination, executed by a processor, may be implemented as an actual hardware system such as a computer system.

The operating system may be, for example, an embedded operating system such as I-OS, Android, Darwin, RTXC, LINUX, UNIX, OS X, WINDOWS, or VxWorks. The operating system includes various procedures, instruction sets, software components, and/or drivers for controlling and managing general system tasks (e.g., memory management, storage device control, power management, etc.), and serves to facilitate communication between various hardware modules and software modules.

The memory 2210 may include, but is not limited to, a cache, a main memory, and a secondary memory. The memory 2210 may include a memory hierarchy implemented through any combination of a RAM (e.g., SRAM, DRAM, DDRAM), ROM, FLASH, magnetic and/or optical storage device (e.g., disk drive, magnetic tape, compact disk (CD), and digital video disc (DVD), etc.).

The peripheral device interface 2300 serves to enable communication between the processor 2100 and peripheral devices.

The peripheral devices are for providing different specific functions to the hardware system 2000. In the first embodiment, the peripheral devices may include, for example, a communication unit 2310.

The communication unit 2310 performs a communication function with other devices. To this end, the communication unit 2310 may include, but is not limited to, an antenna system, an RF transceiver, one or more amplifiers, a tuner, one or more oscillators, a digital signal processor, a CODEC chipset, a memory, and a suitable circuit.

The communication unit 2310 may support wired/wireless communication protocols. The wireless communication protocol may include, for example, wireless local area network (WLAN), digital living network alliance (DLNA), wireless broadband (Wibro), world interoperability for microwave access (Wimax), global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), LTE-Advanced (LTE-A), 5G communication system, wireless mobile broadband service (WMBS), Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi direct, and the like. In addition, the wired communication protocol may include, for example, wired LAN, wired wide area network (wired WAN), power line communication (PLC), USB communication, Ethernet, serial communication, optical/coaxial cable, and the like.

In the hardware system 2000 according to the second embodiment, each component stored in the form of a software module in the memory 2210 performs an interface with the communication unit 2310 through the memory interface 2200 and the peripheral device interface 2300 in the form of an instruction executed by the processor 2100.

Figure 9:
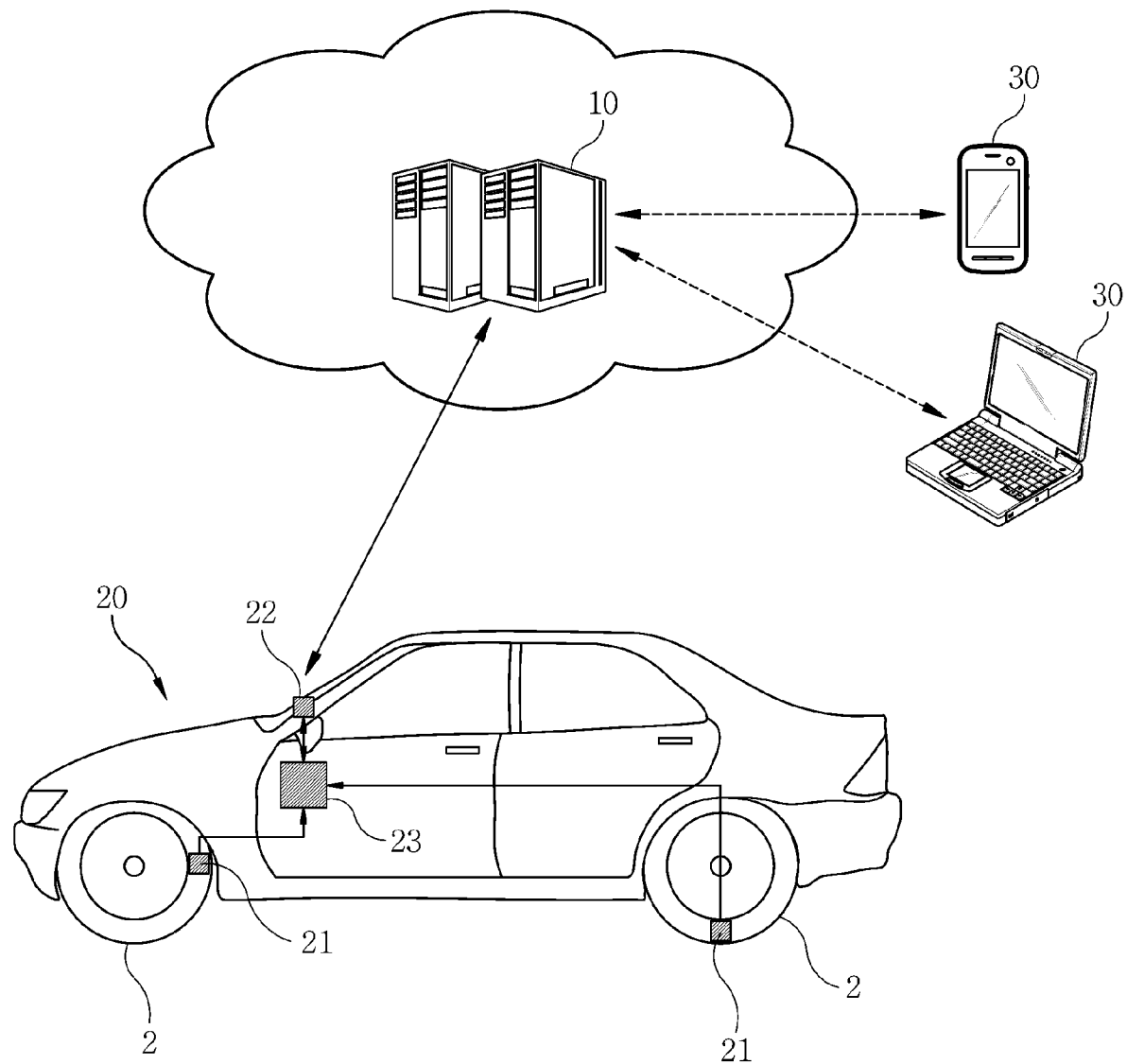
FIG. 9 is a diagram illustrating a system for analyzing a road surface condition by using a resonance sound in a tire according to a second embodiment of the present disclosure.

Next, a system for analyzing a road surface condition by using a resonance sound in a tire according to a second embodiment of the present disclosure will be described. Although the resonance sound inside the tire will be used as an example in the second embodiment described below, a noise acquisition source or target is not limited to the tire internal resonance sound. In alternative examples, various noise acquisition sources or targets such as a friction sound between a road surface and a tire may be applied to the second embodiment. FIG. 9 is a diagram illustrating a system for analyzing a road surface condition by using a resonance sound in a tire according to a second embodiment of the present disclosure. Referring to FIG. 9, the system according to the second embodiment includes a traffic server 10, a plurality of vehicle devices 20 managed by the traffic server 10, and a manager device 30.

The traffic server 10 is an apparatus configured to analyze an audio signal received from the vehicle device 20 installed in a vehicle, thereby recognizing the road surface condition and also recognizing the deterioration of a tire 2 of the vehicle. Specifically, the traffic server 10 can receive audio signals, collected from the inside of the tire, from a plurality of vehicle devices 20, process and analyze the received audio signals, and thereby recognize the road surface condition and each vehicle tire condition.

The vehicle device 20 is an apparatus installed in a vehicle and may be, for example, a trip computer or a navigation device. The vehicle device 20 may include a microphone 21 installed inside the tire 2 and collecting an audio signal, a transceiver 22 transmitting the audio signal to the traffic server 10, and a microcontroller unit (MCU) 23 controlling the microphone 21 and the transceiver 22. The vehicle device 20 may be an Internet of Things (IoT) device. The vehicle device 20 may access the traffic server 10 through a network and transmit the audio signal to the traffic server 10. In case that there are a plurality of vehicle devices 20, the plurality of vehicle devices 20 may organize a sensor network. In this case, each of the plurality of vehicle devices 20 may transmit a measured audio signal to any one vehicle device 20, which may transmit a plurality of received audio signals to the traffic server 10.

The manager device 30 is an apparatus used by a manager responsible for managing the traffic server 10. The manager device 30 may be, for example, a smartphone, a tablet, a phablet, a notebook computer, or a personal computer. The manager device 30 may access the traffic server 10 in response to a manager's manipulation and perform necessary settings or receive information provided by the traffic server 10.

Figure 10:
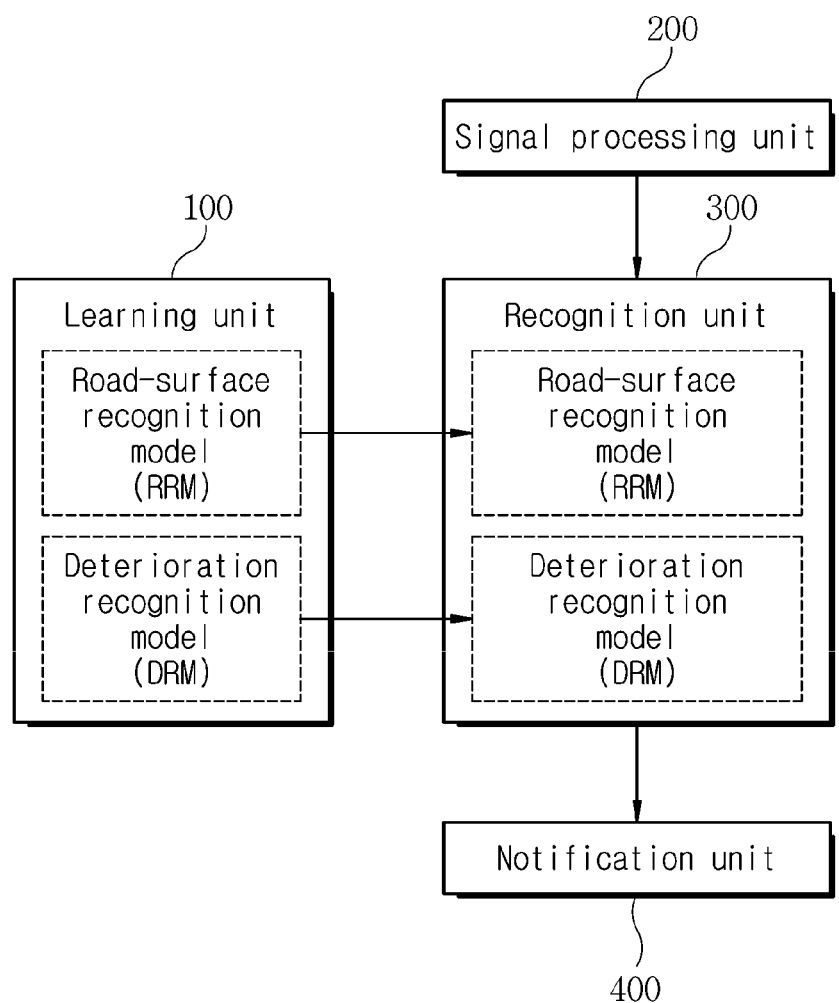
FIG. 10 is a block diagram illustrating the configuration of a traffic server according to the second embodiment of the present disclosure.

Next, the traffic server 10 according to the second embodiment of the present disclosure will be described in more detail. FIG. 10 is a block diagram illustrating the configuration of a traffic server according to the second embodiment of the present disclosure.

Referring to FIG. 10, the traffic server 10 includes a learning unit 100, a signal processing unit 200, a recognition unit 300, and a notification unit 400.

The learning unit 100 is a component configured to generate a road-surface recognition model (RRM) and a deterioration recognition model (DRM). The learning unit 100 may generate the road-surface recognition model RRM and the deterioration recognition model DRM by using the same training data, and the road-surface recognition model RRM may be generated based on the deterioration recognition model DRM. The learning unit 100 may provide the generated road-surface recognition model RRM and the generated deterioration recognition model DRM to the recognition unit 200.

Each of the road-surface recognition model RRM and the deterioration recognition model DRM includes a plurality of layers, and each of the plurality of layers performs a plurality of operations. In one layer, each of operation results of a plurality of operation modules is weighted and then transmitted to the next layer. This means that a weight is applied to an operation result of one layer and the weighted result is inputted to the operation of the next layer. That is, each of the road-surface recognition model RRM and the deterioration recognition model DRM performs a plurality of operations in which weights of a plurality of layers are applied.

The road-surface recognition model RRM may be a classification network that when an audio-of-interest signal is inputted, performs a plurality of operations in which a plurality of layer weights are applied, and thereby computes a predictive value for a road surface condition (normal, hydroplaning, icy, snow-covered, etc.). The predictive value is a predicted probability for each of a plurality of predetermined road surface conditions. For example, assuming that the predetermined road surface conditions are four including normal, hydroplaning, icy, and snow-covered, the predictive value represents probabilities of four conditions. For example, the predictive value may be expressed as '(normal, hydroplaning, icy, snow-covered)=[0.01, 0.02, 0.17, 0.80]'. This means that the probability that the road surface is in a normal condition is 1%, the probability that the road surface is in a hydroplaning condition is 2%, the probability that the road surface is in an icy condition is 17%, and the probability that the road surface is in a snow-covered condition is 80%. The road-surface recognition model RRM may be, for example, a Convolution Neural Network (CNN), a Recurrent Neural Network (RNN), or the like.

The deterioration recognition model DRM may be a generative network that generates an imitated audio-of-interest signal that imitates an inputted audio-of-interest signal. The deterioration recognition model DRM may be, for example, a Restricted Boltzmann Machine (RBM), an Auto-Encoder (AE), or a Generative Adversarial Network (GAN).

The plurality of layers in each of the road-surface recognition model RRM and the deterioration recognition model DRM includes one or a combination of a fully-connected layer, a convolutional layer, a recurrent layer, a graph layer, and a pooling layer. The plurality of operations may include, for example, a convolution operation, a down-sampling operation, an up-sampling operation, an operation by an activation function, and the like. The activation function may be, for example, Sigmoid, Hyperbolic tangent (tanh), Exponential Linear Unit (ELU), Rectified Linear Unit (ReLU), Leakly ReLU, Maxout, Minout, Softmax, and the like.

The signal processing unit 200 is a component configured to receive an audio signal from the vehicle device 40 and detect an audio-of-interest signal from the received audio signal. The signal processing unit 200 provides the detected audio-of-interest signal to the recognition unit 300. The audio-of-interest signal refers to an audio signal of a frequency-of-interest band among audio signals. The frequency-of-interest band refers to a dominant frequency band of a resonance sound generated by friction between the tire and the road surface when the vehicle is driving. The frequency-of-interest band may be predetermined. Specifically, a dominant frequency band of a resonance sound may be detected and set as the frequency-of-interest band. The dominant frequency band refers to a frequency band that is repeatedly detected a predetermined number of times or more among frequency bands detected from resonance sounds generated inside the tire due to friction between the tire and the road surface during a plurality of driving. For example, a frequency band that is repeatedly detected a specific number of times or more among frequency bands detected from a plurality of resonance sounds collected a plurality of number of times inside the tire may be the dominant frequency band.

The recognition unit 300 is a component configured to analyze the audio-of-interest signal through the road-surface recognition model RRM and thereby recognize the road surface condition. In addition, the recognition unit 300 is further configured to analyze the audio-of-interest signal through the deterioration recognition model DRM and thereby recognize the deterioration of the tire of the vehicle.

The notification unit 400 is a component configured to provide the road surface condition recognized by the recognition unit 300 through the road-surface recognition model RRM to the vehicle device 20 and the manager device 30. Also, the notification unit 400 is further configured to provide the deterioration of the tire recognized by the recognition unit 300 through the deterioration recognition model DRM to the vehicle device 20 and the manager device 30.

Figure 11:
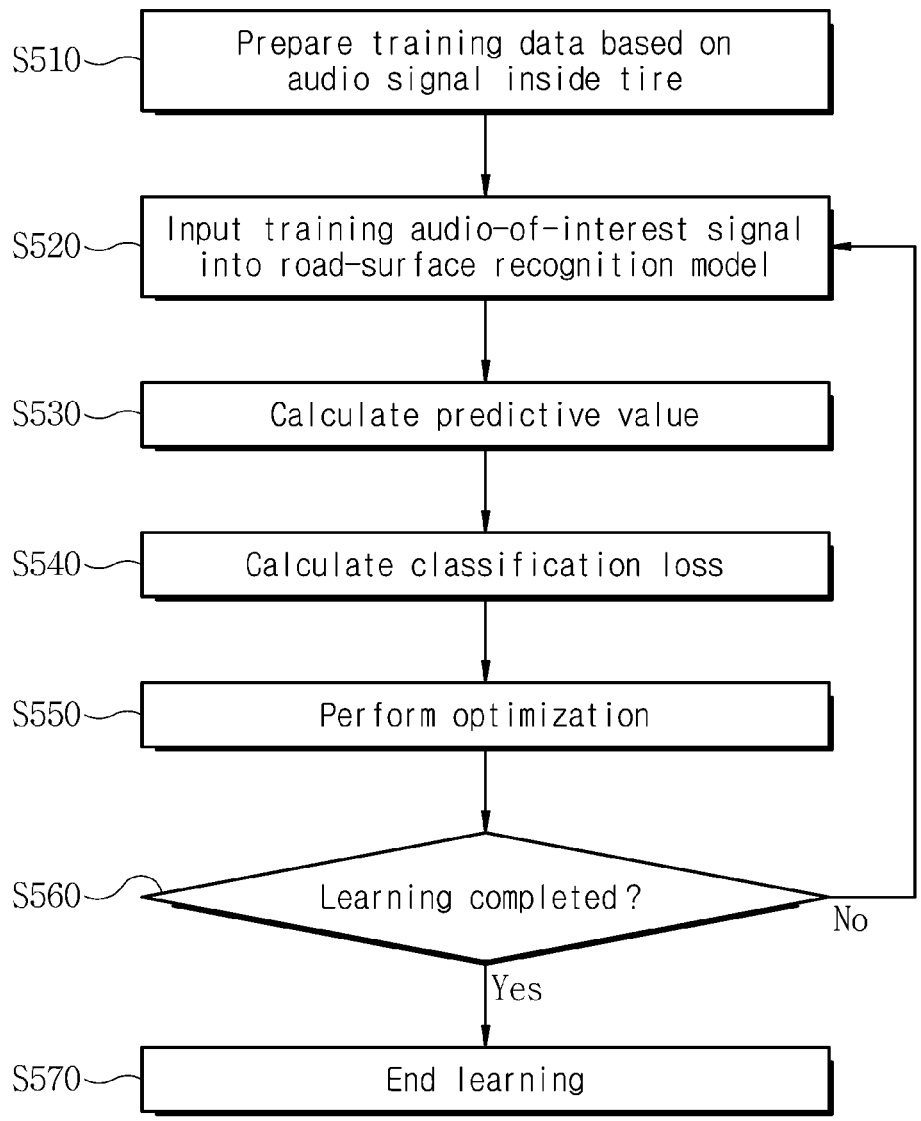
FIG. 11 is a flowchart illustrating a method for generating a road-surface recognition model according to the second embodiment of the present disclosure.

Next, a method for generating a road-surface recognition model RRM according to the second embodiment of the present disclosure will be described. FIG. 11 is a flowchart illustrating a method for generating a road-surface recognition model according to the second embodiment of the present disclosure.

Referring to FIG. 11, at step S510, the learning unit 100 (in FIG. 10) prepares training data for the road-surface recognition model RRM, based on an audio signal inside the tire. The training data includes a training audio-of-interest signal and a label. The training audio-of-interest signal is generated by detecting an audio signal in a frequency-of-interest band from the audio signal inside the tire generated by friction between the tire of the vehicle and the road surface while the vehicle is driving. The label indicates any one condition corresponding to the training audio signal among a plurality of road surface conditions (normal, hydroplaning, icy, and snow-covered). For example, the label may be a one-hot-encoding vector that indicates any one of normal, hydroplaning, icy, and snow-covered conditions.

At step S520, the learning unit 100 inputs the training audio-of-interest signal into the road-surface recognition model RRM. Then, at step S530, the road-surface recognition model RRM calculates a predictive value for predicting the road surface condition through a plurality of operations in which unlearned weights between layers are applied. The predictive value indicates a predicted probability for each of a plurality of road surface conditions.

Then, at step S540, the learning unit 100 calculates a classification loss indicating a difference between the predictive value and the label through a loss function. For example, the learning unit 100 may obtain the classification loss through a binary cross-entropy function that is the loss function.

Then, at step S550, the learning unit 100 performs optimization for correcting the weight of the road-surface recognition model RRM to minimize the classification loss derived through the loss function. For example, to minimize the binary cross-entropy loss, the learning unit 100 performs optimization for correcting the weight of the road-surface recognition model RRM.

The above steps S520 to S550 are repeatedly performed using a plurality of different training data, and thus the weight of the road-surface recognition model RRM is repeatedly updated.

Such iteration is performed until the classification loss becomes less than or equal to a predetermined target value. Therefore, at step S560, the learning unit 100 determines whether the classification loss calculated at the step S540 is less than or equal to the predetermined target value. If the classification loss is less than or equal to the predetermined target value, the learning of the road-surface recognition model RRM is completed at step S570.

Figure 12:
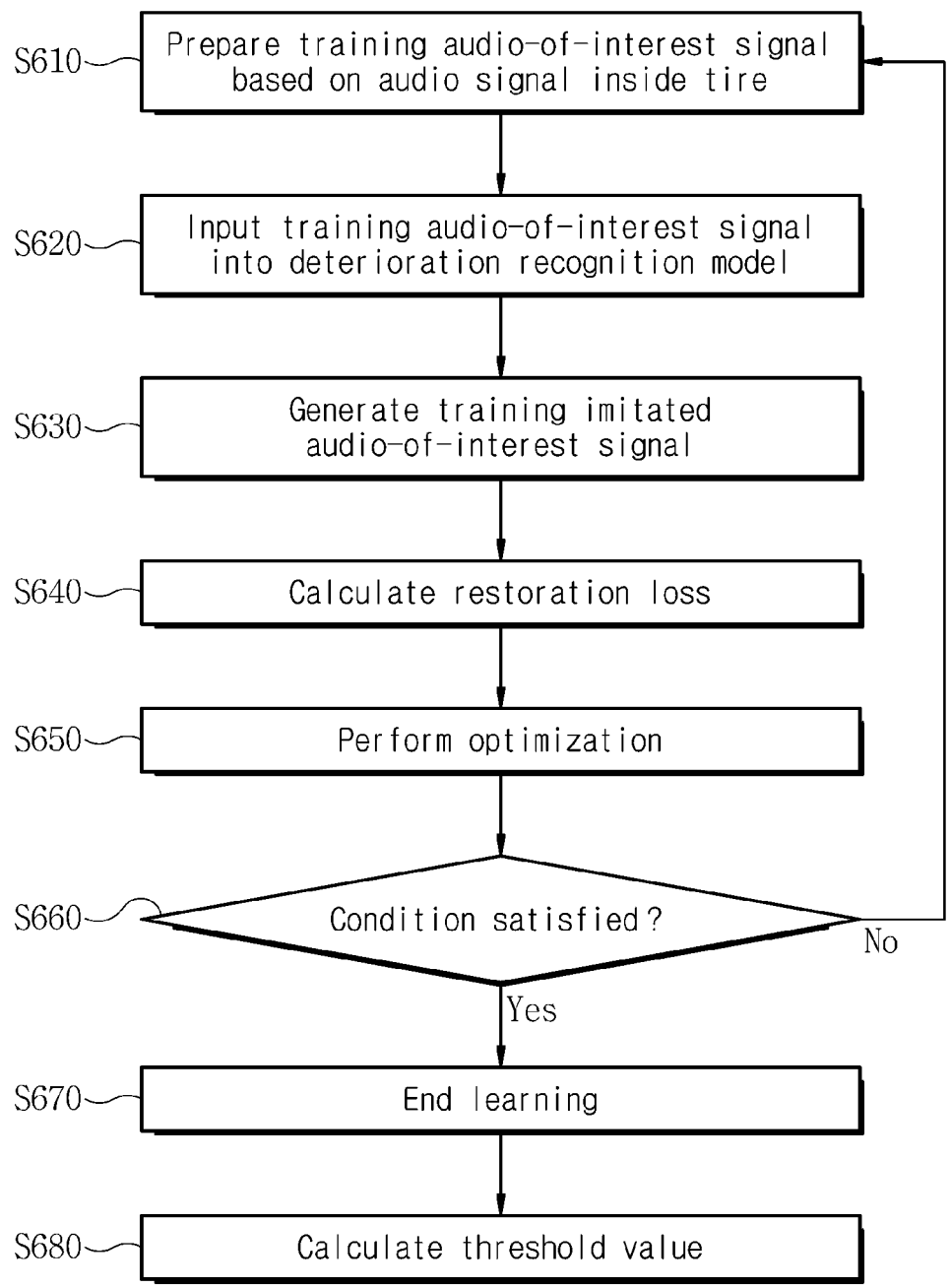
FIG. 12 is a flowchart illustrating a method for generating a deterioration recognition model according to the second embodiment of the present disclosure.

Next, a method for generating a deterioration recognition model DRM according to the second embodiment of the present disclosure will be described. FIG. 12 is a flowchart illustrating a method for generating a deterioration recognition model according to the second embodiment of the present disclosure.

Referring to FIG. 12, the learning unit 100 (in FIG. 10) prepares training data based on the audio signal inside the tire at step S610. The training data is an audio-of-interest signal for training. The training audio-of-interest signal is obtained by detecting the audio signal in the frequency-of-interest band from the audio signal inside the tire generated by friction between the tire of the vehicle and the road surface during driving of the vehicle equipped with the tire in a normal state.

At step S620, the learning unit 100 enters the training audio-of-interest signal into the deterioration recognition model DRM that does not complete learning. Then, at step S630, the deterioration recognition model DRM generates a training imitated audio-of-interest signal that imitates the training audio-of-interest signal, by compressing and restoring the training audio-of-interest signal through a plurality of operations in which a plurality of layer weights are applied to the training audio-of-interest signal.

For example, in case that the deterioration recognition model DRM is an auto-encoder, the encoder of the deterioration recognition model DRM performs a plurality of operations in which a plurality of layer weights are applied to the training audio-of-interest signal, thereby compressing the training audio-of-interest signal and generating a latent vector, and the decoder of the deterioration recognition model DRM performs a plurality of operations in which a plurality of layer weights are applied to the latent vector generated by the encoder, thereby generating the training imitated audio-of-interest signal.

Then, at step S640, the learning unit 100 calculates a restoration loss indicating a difference between the training audio-of-interest signal and the training imitated audio-of-interest signal through a loss function.

In this case, the learning unit 100 may calculate the restoration loss according to Equation 1 below.

$$L = \frac{1}{m}\sum_{j=1}^{m} g(X(j), Y(j)) \qquad \text{[Equation 1]}$$

In Equation 1, X denotes a training audio-of-interest signal, and Y denotes a training imitated audio-of-interest signal. In addition, g denotes a loss function, m denotes the number of training data, that is, the total number of training audio-of-interest signals, and j denotes the index of training data, that is, the index of a training audio-of-interest signal and a training imitated audio-of-interest signal.

Also, in Equation 1, the loss function may be Equation 2 below.

$$g(X,Y) = |X-Y|_2 \qquad \text{[Equation 2]}$$

In Equation 2, X denotes a training audio-of-interest signal, and Y denotes a training imitated audio-of-interest signal. As can be seen from Equations 1 and 2, the restoration loss indicates a difference between the training audio-of-interest signal and the training imitated audio-of-interest signal.

Then, at step S650, the learning unit 100 performs optimization for updating the weight of the deterioration recognition model DRM through a backpropagation algorithm to minimize the restoration loss.

Then, at step S660, the learning unit 100 determines whether a condition necessary for the end of learning is satisfied. This condition may be whether the restoration loss calculated at the step S640 is less than a predetermined target value. If it is determined at the step S660 that the condition necessary for the end of learning is not satisfied, that is, if the restoration loss calculated at the step S640 is equal to or greater than the target value, the process proceeds to step S610 and repeats steps S610 to S660. This means that learning is repeated using a plurality of different training audio-of-interest signals. On the other hand, if it is determined at the step S660 that the condition necessary for the end of learning is satisfied, that is, if the restoration loss calculated at the step S640 is less than the target value, the process proceeds to step S670 to end the learning.

When the learning is completed, at step S680, the learning unit 100 derives a threshold value of the deterioration recognition model DRM. According to an embodiment, the learning unit 100 prepares a plurality of test audio-of-interest signals. The test audio-of-interest signal is prepared in the same method as the training audio-of-interest signal. That is, like the training audio-of-interest signal, the test audio-of-interest signal can be obtained by detecting an audio signal in a frequency-of-interest band from audio signals inside the tire generated by friction between the vehicle's tire and the road surface during driving of the vehicle equipped with the tire in a normal state. Next, the learning unit 100 enters a plurality of test audio-of-interest signals into the deterioration recognition model DRM for which the learning has been completed. Then, the deterioration recognition model DRM generates a plurality of test imitated audio-of-interest signals imitating the plurality of test audio-of-interest signals. Thus, the learning unit 100 calculates the threshold of the deterioration recognition model DRM through Equation 3 below.

$$\theta = \mu + (k \times \sigma) \qquad \text{[Equation 3]}$$

In Equation 3, θ denotes a threshold value. In addition, μ denotes the average of the mean squared error (MSE)

between the plurality of test audio-of-interest signals and the plurality of test imitated audio-of-interest signals corresponding to the plurality of test audio-of-interest signals. Also, σ denotes the standard deviation of the mean squared error (MSE) between the plurality of test audio-of-interest signals and the plurality of test imitated audio-of-interest signals corresponding to the plurality of test audio-of-interest signals. Also, k denotes a weight for the standard deviation, and it is a preset value. The learning unit 100 provides the recognition unit 300 with the learning-completed deterioration recognition model DRM and the threshold value of the deterioration recognition model DRM.

Figure 13:
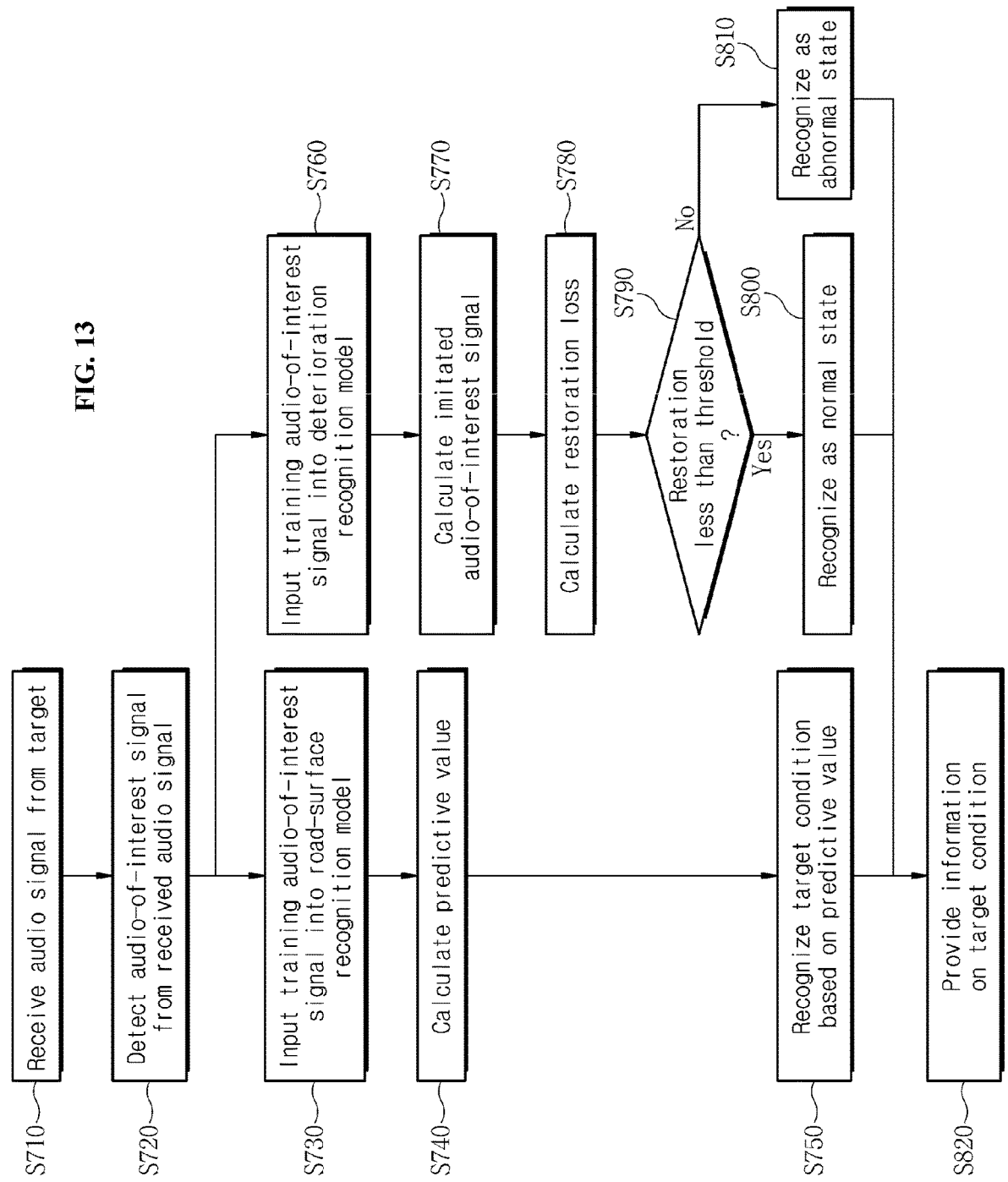
FIG. 13 is a flowchart illustrating a method for analyzing a road surface condition by using a resonance sound in a tire according to the second embodiment of the present disclosure.

Next, a method for analyzing a road surface condition by using a resonance sound in a tire according to the second embodiment of the present disclosure will be described. FIG. 13 is a flowchart illustrating a method for analyzing a road surface condition by using a resonance sound in a tire according to the second embodiment of the present disclosure.

Referring to FIG. 13, at step S710, the signal processing unit 200 of the traffic server 10 receives an audio signal from the vehicle device 20. The received audio signal is collected by the vehicle device 20 from the inside of the tire through the microphone 21 installed in the tire when friction between the vehicle's tire and the road surface occurs while the vehicle is driving. As such, when the audio signal is received, the signal processing unit 200 detects at step S720 an audio-of-interest signal, which is an audio signal having a predetermined frequency-of-interest band, from the received audio signal. The detected audio-of-interest signal is provided to the recognition unit 300. The frequency-of-interest band refers to a dominant frequency band of a resonance sound inside the tire generated by friction between the vehicle's tire and the road surface when the vehicle is driving. Alternatively, as in the above-described first embodiment, the frequency-of-interest band may be a dominant frequency band of a friction sound itself between the tire and the road surface.

Then, at step S730, the recognition unit 300 inputs the audio-of-interest signal to the learned road-surface recognition model RRM. Then, at step S740, the road-surface recognition model RRM calculates a predictive value for predicting a road surface condition by performing a plurality of operations in which learned weights between layers are applied. Then, at step S750, the recognition unit 300 recognizes the road surface condition based on the predictive value. The predictive value is a predicted probability for each of a plurality of predetermined road surface conditions. Thus, from the highest probability in the predictive value, the recognition unit 300 can recognize the road surface condition. For example, if the predictive value is expressed as '(normal, hydroplaning, icy, snow-covered)=[0.01, 0.02, 0.17, 0.80]', this means that the probability that the road surface is in a normal condition is 1%, the probability that the road surface is in a hydroplaning condition is 2%, the probability that the road surface is in an icy condition is 17%, and the probability that the road surface is in a snow-covered condition is 80%. Therefore, based on the highest probability, the recognition unit 300 can recognize that the road surface is in a snow-covered condition. As such, based on the probability of each condition in the predictive value, the recognition unit 300 can recognize a normal road surface condition or any other road surface condition such as hydroplaning, icy, or snow-covered condition.

On the other hand, at step S760, the recognition unit 300 inputs the audio-of-interest signal to the learned deterioration recognition model DRM. Then, at step S770, the deterioration recognition model DRM calculates an imitated audio-of-interest signal that imitates the audio-of-interest signal by performing a plurality of operations in which a plurality of layer weights are applied to the audio-of-interest signal. Then, at step S780, the recognition unit 300 calculates a restoration loss indicating a difference between the audio-of-interest signal and the imitated audio-of-interest signal. In this case, the recognition unit 300 may calculate the restoration loss according to Equation 2 described above.

When the restoration loss is calculated, the recognition unit 300 determines at step S790 whether the restoration loss is less than a predetermined threshold value (Equation 3). If it is determined at the step S790 that the restoration loss is less than the threshold value, the recognition unit 300 recognizes at step S800 that the tire from which the audio signal, which is the basis of the audio-of-interest signal inputted to the deterioration recognition model DRM, is collected is in a normal state. On the other hand, if it is determined at the step S790 that the restoration loss is greater than or equal to the threshold value, the recognition unit 300 recognizes at step S810 that the tire from which the audio signal, which is the basis of the audio-of-interest signal inputted to the deterioration recognition model DRM, is collected is in a deteriorated state.

After the recognition unit 300 recognizes the road surface condition at the step S750 or recognizes the tire deterioration condition at the step S800 or S810, the notification unit 400 provides information on the recognized road surface condition or tire deterioration condition to the vehicle device 20 and the manager device 30 at step S820.

In the second embodiment, the process of determining the tire deterioration condition based on the deterioration recognition model DRM is only an example, and this is applicable even when determining the normal state or abnormal state of a road or other target in addition to the tire.

Meanwhile, the apparatus for analyzing the road surface condition by using the resonance sound in the tire according to the second embodiment may be implemented using the hardware system 2000 described above with reference to FIG. 8. In this case, in the memory 2210, the learning unit 100, the signal processing unit 200, the recognition unit 300, and the notification unit 400, which are components described above with reference to FIG. 10, may be stored in the form of a software module. Also, an operating system (OS) or the like may be further stored. Each of the learning unit 100, the signal processing unit 200, the recognition unit 300, and the notification unit 400 may be loaded and executed in the processor 2100.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter described herein have been described. Other embodiments are within the scope of the following claims. For example, the operations recited in the claims may be performed in a different order and still achieve desirable results. By way of example, the process illustrated in the accompanying drawings does not necessarily require a particular illustrated sequence or sequential order to obtain desired results. In certain implementations, multitasking and parallel processing may be advantageous.

While this disclosure has been particularly shown and described with reference to an exemplary embodiment thereof, it will be understood by those skilled in the art that various changes in form and details may be made therein without departing from the scope of this disclosure as defined by the appended claims.

What is claimed is:

1. A method for analyzing a road surface condition, comprising:
    providing a training audio signal obtained by sensors placed along a side of a road to collect driving noise generated when a vehicle travels on the road;
    generating a label audio-of-interest signal by converting the training audio signal into a frequency domain signal, and erasing a frequency band other than a frequency-of-interest band by applying one or more band filters to the training audio signal to attenuate one or more bands other than the frequency-of-interest band in the training audio signal;
    generating a training imitated audio-of-interest signal imitating an audio-of-interest signal in which a band other than the frequency-of-interest band is attenuated from the training audio signal, by applying weights in one or more layers of a frequency selection model for training to the training audio signal;
    determining a generation loss that is a difference between the training imitated audio-of-interest signal and the label audio-of-interest signal;
    iteratively updating the weights in one or more layers of the frequency selection model for training to generate a trained frequency selection model with trained weights by reducing the generation loss;
    receiving a subsequent audio signal obtained by the sensors placed along the side of the road;
    generating an audio-of-interest signal for analysis from the received subsequent audio signal by processing the subsequent audio signal via the trained frequency selection model; and
    recognizing, the road surface condition indicated by the subsequent audio signal by analyzing the audio-of-interest signal for analysis through a trained recognition model.

2. The method of claim 1, wherein generating the label audio-of-interest signal further includes:
    removing noise generated in a predetermined frequency band by using a noise removal filter.

3. The method of claim 1, wherein generating the audio-of-interest signal for analysis includes:
    generating the audio-of-interest signal for analysis in which the band other than the frequency-of-interest band is attenuated from the received audio signal by applying the trained weights to the received subsequent audio signal.

4. The method of claim 1, wherein recognizing the road surface condition includes:
    sending the audio-of-interest signal for analysis to the trained recognition model;
    determining a predictive value for predicting the road surface condition by applying trained weights in layers of the trained recognition model to the audio-of-interest signal for analysis; and
    determining the road surface condition indicated by the audio-of-interest signal for analysis based on the predictive value.

5. The method of claim 1, further comprising:
    before receiving the subsequent audio signal,
    preparing training data including a training audio-of-interest signal and a label corresponding to the training audio-of-interest signal;
    providing the training audio-of-interest signal into a recognition model for training;
    determining, by the recognition model for training, a predictive value which is a probability predicted for each of a plurality of road surface conditions by applying untrained weights in layers of the recognition model for training to the training audio-of-interest signal;
    determining a classification loss indicating a difference between the predictive value and the label; and
    iteratively updating the untrained weights of the recognition model for training to generate the trained recognition model by reducing the classification loss.

6. An apparatus for analyzing a road surface condition, comprising:
    a label generator configured to generate a label audio-of-interest signal by converting a training audio signal into a frequency domain signal, and erasing a frequency band other than a frequency-of-interest band by applying one or more band filters to the training audio signal to attenuate one or more bands other than the frequency-of-interest band in the training audio signal, the training audio signal obtained by sensors placed along a side of a road to collect driving noise generated when a vehicle travels on the road; and
    a learning unit configured to:
        provide the training audio signal to the label generator and a frequency selection model for training,
        generate a training imitated audio-of-interest signal imitating an audio-of-interest signal in which one or more bands other than a frequency-of-interest band are attenuated from the training audio signal, by performing by applying weights of the frequency selection model to the training audio signal,
        determine a generation loss that is a difference between the training imitated audio-of-interest signal and the label audio-of-interest signal, and
        iteratively updating the weights in one or more layers of the frequency selection model for training to generate a trained frequency selection model with trained weights by reducing the generation loss;

a signal processor configured to, responsive to receiving a subsequent audio signal obtained by the sensors placed along the side of the road, generate an audio-of-interest signal for analysis from the received subsequent audio signal by processing the subsequent audio signal via the trained frequency selection model; and a recognition unit configured to recognize the road surface condition indicated by the subsequent audio signal by analyzing the audio-of-interest signal for analysis through a trained recognition model.

7. The apparatus of claim 6, wherein the label generator is further configured to:

remove noise generated in a predetermined frequency band by using a noise removal filter.

8. The apparatus of claim 6, wherein the trained frequency selection model is configured to generate the audio-of-interest signal for analysis in which the band other than the frequency-of-interest band is attenuated from the received audio signal by applying the trained weights to the received subsequent audio signal.

9. The apparatus of claim 6, wherein the recognition unit is configured to:

send the audio-of-interest signal for analysis to the trained recognition model, and determine a predictive value for predicting the road surface condition by applying trained weights in layers of the trained recognition model to the audio-of-interest signal for analysis, and determine the road surface condition indicated by the audio-of-interest signal for analysis based on the predictive value.

10. The apparatus of claim 6, wherein the learning unit is configured to:

prepare training data including a training audio-of-interest signal and a label corresponding to the training audio-of-interest signal, provide the training audio-of-interest signal into a recognition model for training, determine, by using the recognition model for training, a predictive value which is a probability predicted for each of a plurality of road surface conditions by applying untrained weights in layers of the recognition model for training to the training audio-of-interest signal, determine a classification loss indicating a difference between the predictive value and the label, and iteratively update the untrained weights of the recognition model for training to generate the trained recognition model by reducing the classification loss.

\* \* \* \* \*